July 3, 1928.
R. E. MURPHY
1,675,903
BEAN HARVESTER
Filed Jan. 30, 1926
3 Sheets-Sheet 1
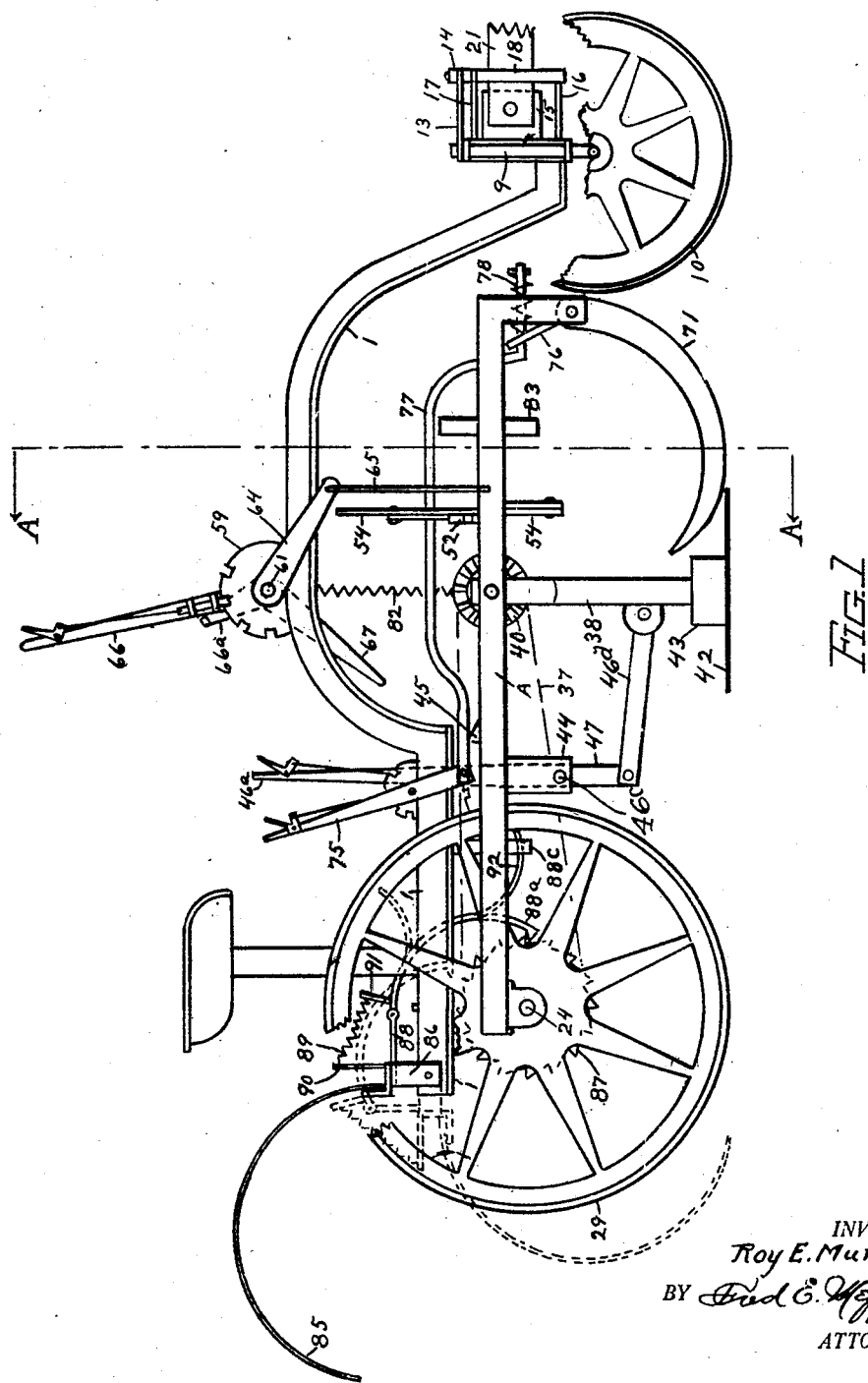
INVENTOR.
Roy E. Murphy
BY Fred E. Wofford
ATTORNEYS.

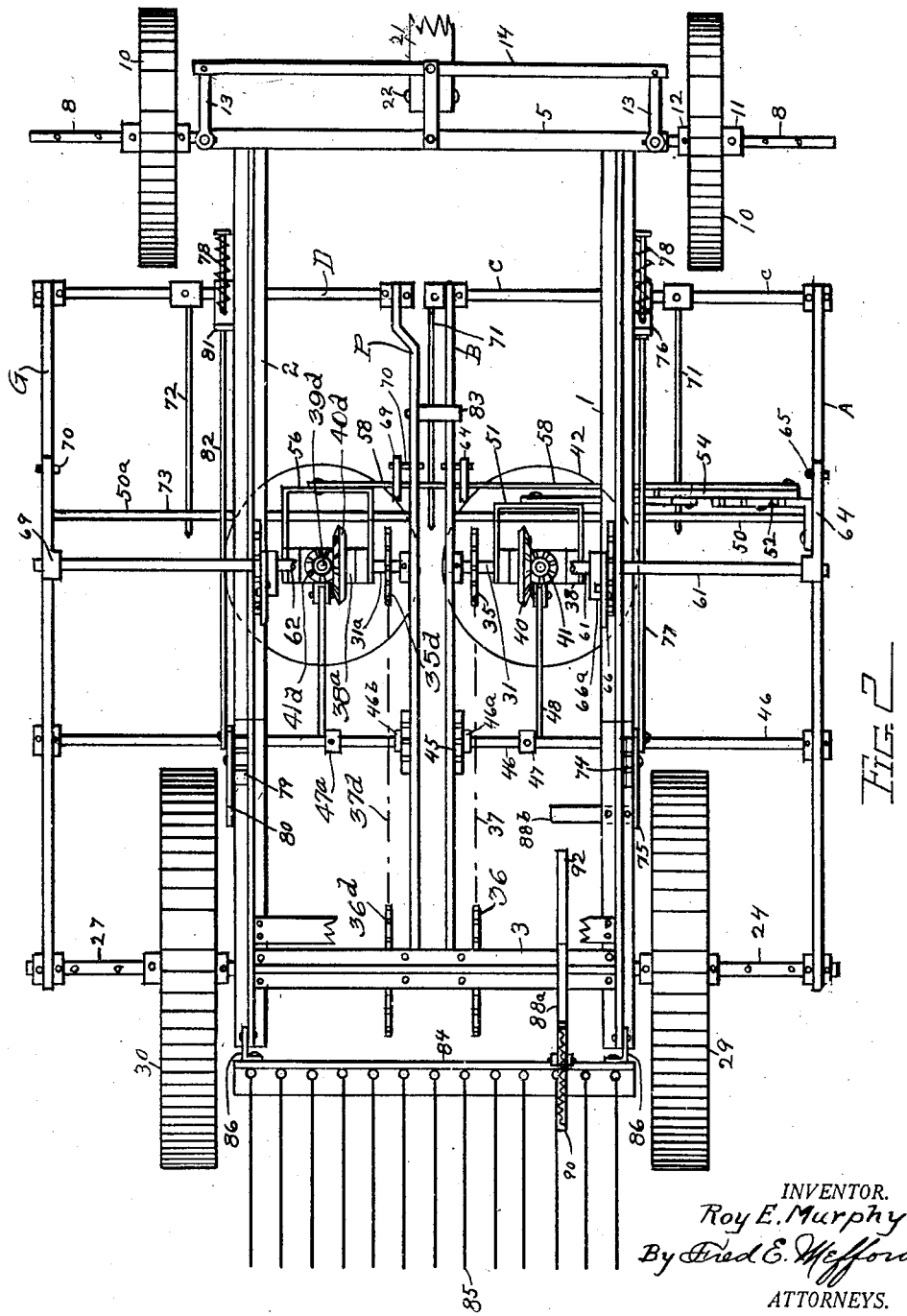

July 3, 1928.
R. E. MURPHY
BEAN HARVESTER
Filed Jan. 30, 1926
1,675,903
3 Sheets-Sheet 3
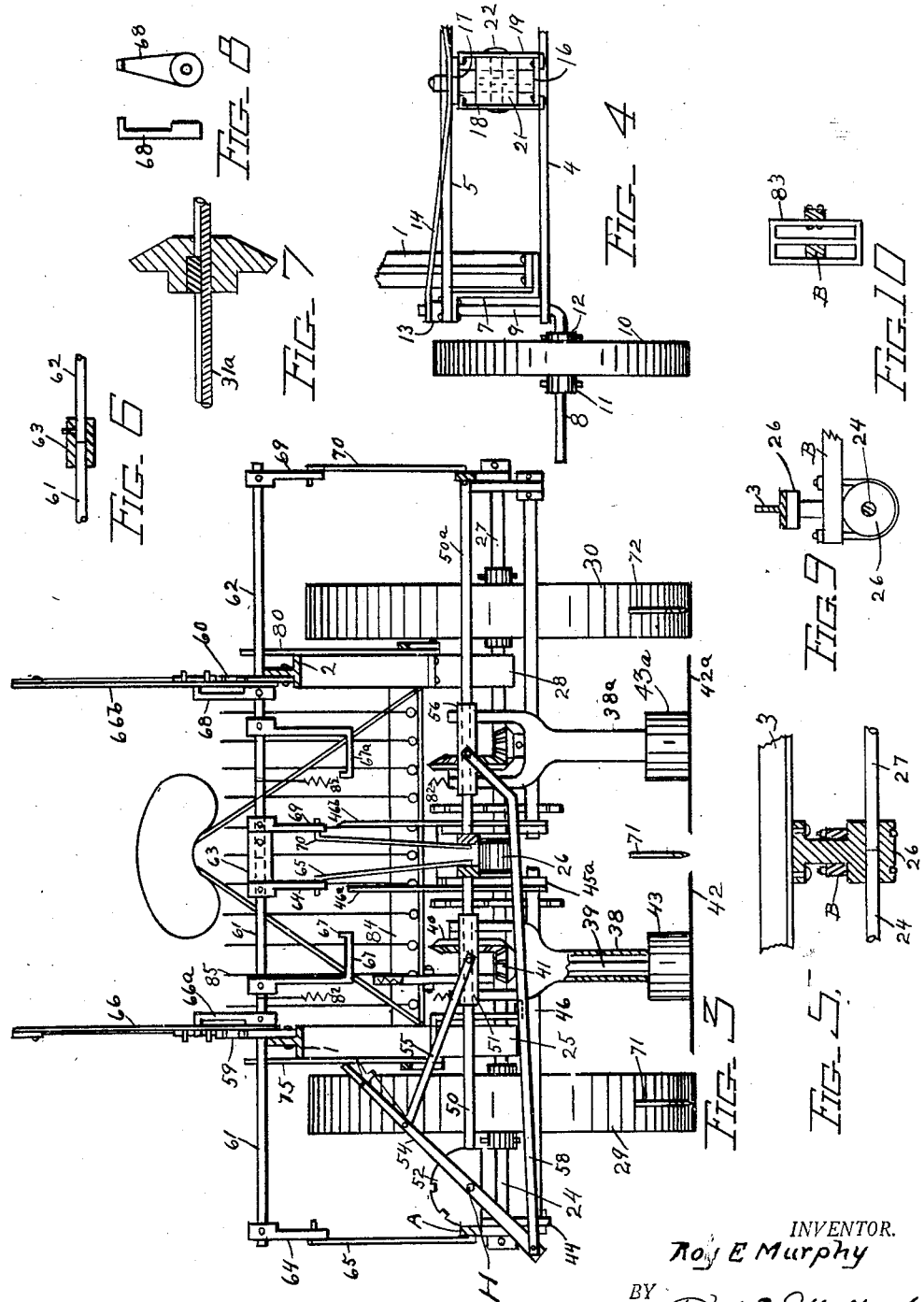
INVENTOR.
Roy E Murphy
BY
Fred E. Welford
ATTORNEYS.

Patented July 3, 1928.

1,675,903

UNITED STATES PATENT OFFICE.

ROY E. MURPHY, OF COLORADO SPRINGS, COLORADO, ASSIGNOR OF ONE-THIRD TO FRED E. MEFFORD, OF COLORADO SPRINGS, COLORADO.

BEAN HARVESTER.

Application filed January 30, 1926. Serial No. 84,891.

My invention relates to machines for cutting bean bushes and my object in general is to provide a machine of this class which will cut and pile bean bushes without shattering the beans. Specific objects are to provide means in said machines whereby a plurality of rows of bean bushes may be cut and piled; means whereby the cutting mechanism may be shifted transversely to accommodate the machine to differently spaced rows; means whereby the cutting mechanism may be tilted; means whereby each cutting mechanism may be lifted independently by foot or hand power; means whereby the rake may be dumped by the action of the machine; and means whereby tangled rows of bean bushes or vines may be cut apart. Other objects will appear as the description progresses.

Figure 1 represents a side elevation of the machine; Fig. 2, a plan view of Fig. 1, the rake being lowered and the seat broken away; Fig. 3, a vertical sectional elevation on the line A—A in Fig. 1; Fig. 4, a fragmentary front elevation of the steering mechanism; Fig. 5, a fragmentary view, partly in section, of the bearing 26 and drive shafts; Fig. 6, a fragmentary view, partly in section, showing the manner of connecting the rods 61 and 62; Fig. 7, a fragmentary sectional view showing the manner of slidably mounting the gears on the actuating shafts; Fig. 8, an end and a side elevation of an arm; Fig. 9, a side elevation of Fig. 5, and Fig. 10, a fragmentary elevation showing the bracket 83 which holds the pivotally mounted frames together transversely.

Although I have shown the preferred form of my invention, I do not thereby limit myself to the precise details shown but wish it understood that various modifications and changes in the details of construction may be made within the scope of what hereinafter is claimed, without departing from the spirit of the invention.

The rigid frame comprises T bars 1 and 2, a rear cross bar 3, a front cross bar 4 and a flat bar 5 connected to front bar 4 by upright bars 7.

Front axles 8 are provided with vertical portions 9 pivotally mounted in bars 4 and 5. Front wheels 10 are mounted on axles 8 and held in place by collars 11 and 12. Arms 13 are rigidly mounted on upright portions 9 and pivotally connected to each other by bar 14. A bolt extends through bars 4 and 5 and a vertically disposed plate 15 is mounted on said bolt. Horizontally disposed plates 16 and 17 are mounted on said bolt and connected together by bars 18 and 19. A tongue 21 is disposed between bars 18 and 19 and connected to plate 15 by bolt 22. Bar 14 is pivotally connected to plate 17.

Drive shaft 24 is journalled in bearings 25 and 26 and drive shaft 27 is journalled in bearings 26 and 28. Traction wheels 29 and 30 are keyed on drive shafts 24 and 27, respectively.

The rectangular frame located on the right hand side of the machine comprises two side bars A and B pivotally mounted on drive shaft 24 and bearing 26, respectively. A transversely disposed actuating shaft 31 is journalled in side bars A and B and carries a sprocket 35. A sprocket 36 is mounted on drive shaft 24 and connected to sprocket 35 by a sprocket chain 37. The movable rectangular frame located on the left hand side of the machine comprises side bars P and G pivotally mounted on bearing 26 and drive shaft 27, respectively. An actuating shaft 31$^a$ is journalled in side bars P and G and carries a sprocket 35$^d$. A sprocket 36$^d$ is mounted on drive shaft 27 and connected to sprocket 35$^d$ by a sprocket chain 37$^d$.

A vertically disposed housing 38 is slidably and rotatably mounted on actuating shaft 31 and carries a vertically disposed shaft 39 journalled therein. An actuating bevel gear 40 is slidably keyed on actuating shaft 31 and meshes with bevel gear 41 mounted on vertical shaft 39. A horizontally disposed cutting disc 42 is mounted on the lower end of shaft 39 and carries a circular guard 43.

A vertically disposed housing 38$^a$ is slidably and rotatably mounted on actuating shaft 31$^a$ and carries a vertically disposed shaft 39$^d$ journalled therein. An actuating bevel gear 40$^d$ is slidably keyed on actuating shaft 31$^a$ and meshes with a bevel gear 41 mounted on vertical shaft 39$^d$. A horizontally disposed cutting disc 42$^a$ is mounted on the lower end of shaft 39$^d$ and carries a circular guard 43$^a$.

The tilting means for housing 38 comprises an arm 44 secured to side bar A, a quadrant 45, having a downward extension 45$^a$, mounted on side bar B; a transversely disposed bar 46, preferably square, journalled in arm 44 and extension 45ª; a lever 46ª slidably mounted on bar 46 and provided with a latch cooperating with quadrant 45; an arm 47 slidably mounted on square bar 46; and a connecting bar 48 to housing 38. The pivotal point of lever 46ª is the bar 46 upon which it is mounted. A similar tilting means for housing 38ª is operated by lever 46ᵇ.

Transversely disposed bar 50 is mounted in side bars A and B and bar 50ª is mounted in side bars P and G. U members 51 and 56 are slidably mounted on bars 50 and 50ª, respectively. U member 51 fits over the yoke portion of housing 38 and U member 56, over the yoke portion of housing 38ª. A quadrant 52 is mounted on side bar A and cooperates with a lever 54. A bar 55 is pivoted to U member 51 and connected to lever 54 and a bar 58 is pivoted to U member 56 and connected to the lower arm of lever 54. Quadrants 59 and 60 are mounted on side bars 1 and 2, respectively. Rod 61 is journalled in quadrant 59 and rod 62, in quadrant 60. A sleeve 63 is keyed on rod 62 and furnishes a bearing for rod 61. Arms 64 are mounted on rod 61 and connected to side bars A and B, by rod 65. A lever 66 is rotatably mounted on rod 61 and held in position by arm 66ª keyed on rod 61. A foot lever 67 is keyed on rod 61 adjacent to arm 66ª. A lever 66ᵇ is rotatably mounted on rod 62 and held adjacent to quadrant 60 by arm 68. A foot lever 67ª is keyed on rod 62. Arms 69 are keyed on rod 62 and connected to side bars P and G by rods 70.

A bar C is rotatably mounted in side bars A and B and carries knives 71. A bar D is rotatably mounted in side bars P and G and carries a knife 72. A quadrant 74 is mounted on side bar 1 of the rigid frame and a lever 75 cooperates with quadrant 74. An arm 76 is keyed on bar C and connected to lever 75 by rod 77 which extends through arm 76 and carries a spring 78. A quadrant 79 is mounted on bar B and carries a lever 80 connected to arm 81 by rod 82.

The rake comprises an angle bar 84 and tines 85 and is connected to the rear of the rigid frame by lugs 86. The dumping means comprise a toothed wheel 87 mounted on drive shaft 24; an arm 88 mounted on angle 84; a hooked bar 88ª connected to arm 88; a spring 89 connected to arms 90 and 91, and a tripping arm 92.

The discs are positioned for differently spaced rows by operating lever 54. The yoke portion of housing 38 and bevel gear 40 being slidable on shaft 31, the yoke portion of housing 38ª and the bevel gear 40ᵈ, slidable on shaft 31ª, U member 51, slidable on bar 50, and U member 56 slidable on bar 50ª, any transverse movement of a U member will cause the adjacent housing to slide along its supporting shaft. Since lever 54 is pivoted at H and connected to U member 51 by bar 55 and to U member 56 by bar 58, the swing of lever 54 causes the U members to slide along their supporting bars. As each U member slides, it causes the adjacent housing to slide with it. The drawing in Fig. 3 shows the housings at the minimum distance apart. By swinging lever 54 towards the outside of the machine, bar 55 pulls U member 51 towards the outside of the machine, and bar 58 pushes U member 56 towards the opposite side of the machine, thereby increasing the distance between the housings. Arms 47 and 47ª are moved on their respective square bars so that each arm will be in line with the housing it tilts.

In operation the housings are tilted so that the discs are at an angle of about thirty degrees with the ground. The movable frames are lowered by levers 66 and 66ᵇ so that the discs will work approximately one inch under the ground at their front edges. The discs are positioned so that the center of each disc is in line with the row it cuts. Each disc revolves towards the other so that the bean bushes are thrown to the middle between the two rows. The rake gathers the bushes until dumped by the driver. The driver presses bar 92 down with his foot until bar 88ª engages a tooth of toothed wheel 87. The action of toothed wheel 87 pulls bar 88ª forward and lifts the rake as shown in Fig. 1. When the front end 92 strikes lug 88ᵇ on arm 88ᶜ, bar 88ª is disengaged from wheel 87 and the rake drops back as shown in Fig. 2.

In fields where the bushes are tangled, the knives 71 and 72 are used. These knives may be keyed at any desired points on their respective bars and will pass over obstructions such as stones and the like but are lifted manually by levers 75 and 80. The rods 77 and 82 pass through arms 76 and 81 and therefore said arms may slide forward against springs 78 when the knives are passing over obstructions.

When an obstacle is encountered by cutting disc 42, the driver pushes foot lever 67 down which turns rod 61 and lifts side bars A and B. Lifting by the foot lever is accomplished without interference with the hand lever 66 since arm 66ª moves away from lever 66. When lever 66 is pulled back it pushes arm 66ª and lifts the movable frame. The other movable frame is lifted by pushing foot lever 67ª or by pulling hand lever 66ᵇ.

I claim:

1. In a bean harvester, the combination of a rigid frame; drive shafts journalled at the rear of said rigid frame, each shaft carrying a traction wheel keyed thereon; front axles and wheels mounted at the front of said rigid frame; a frame having a transversely disposed actuating shaft journalled therein, pivotally mounted on each drive shaft; driving means for said actuating shafts; a vertically disposed housing, having a vertically disposed shaft journalled therein, pivotally mounted on each actuating shaft, and actuating gears for said vertically disposed shafts.

2. In a bean harvester, the combination of a rigid frame; drive shafts mounted at the rear of said rigid frame, each shaft carrying a traction wheel keyed thereon; front axles and wheels mounted at the front of said rigid frame; a frame, having a transversely disposed actuating shaft journalled therein, pivotally mounted on each drive shaft; driving means for said actuating shafts; a vertically disposed housing, having a vertically disposed shaft journalled therein, pivotally mounted on each actuating shaft; actuating gears for said vertically disposed shafts; a horizontally disposed cutting disc mounted on the lower end of each vertically disposed shaft; and tilting means for said vertically disposed housings.

3. In a bean harvester, the combination of a rigid frame; drive shafts journalled at the rear of said rigid frame, each shaft carrying a traction wheel keyed thereon; front axles and wheels mounted at the front of said rigid frame; a frame, having a transversely disposed actuating shaft journalled therein, pivotally mounted on each drive shaft; driving means for said actuating shafts; a vertically disposed housing, having a vertically disposed shaft journalled therein, pivotally mounted on each actuating shaft; actuating gears for said vertically disposed shafts; a horizontally disposed cutting disc mounted on the lower end of each vertically disposed shaft; tilting means for said vertically disposed housings; and foot operated lifting means for said pivotally mounted frames.

4. In a bean harvester, the combination of a rigid frame; drive shafts journalled at the rear of said rigid frame, each shaft carrying a traction wheel keyed thereon; front axles and wheels mounted at the front of said rigid frame; a frame, having a transversely disposed actuating shaft journalled therein, pivotally mounted on each drive shaft; driving means for said actuating shafts; a vertically disposed housing, having a vertically disposed shaft journalled therein, pivotally mounted on each actuating shaft; actuating gears for said vertically disposed shafts; a horizontally disposed cutting disc mounted on the lower end of each vertically disposed shaft; tilting means for said vertically disposed housings; foot operated lifting means for said pivotally mounted frames; lever operated lifting means for said pivotally mounted frames; and means to shift said housings transversely.

5. In a bean harvester, the combination of a rigid frame; drive shafts mounted at the rear of said rigid frame, each shaft carrying a traction wheel keyed thereon; front axles and wheels mounted at the front of said rigid frame; a frame, having a transversely disposed actuating shaft journalled therein, pivotally mounted on each drive shaft; driving means for said actuating shafts; a vertically disposed housing, having a vertically disposed shaft journalled therein, pivotally mounted on each actuating shaft; actuating gears for said actuating shafts; a horizontally disposed cutting disc mounted on the lower end of each vertically disposed shaft; means to shift said pivotally mounted housings transversely; tilting means for said housing, said means including a transversely disposed bar mounted in each pivotally mounted frame, an arm slidably mounted on each transversely disposed bar, a longitudinally disposed bar connecting each arm with the adjacent housing, and a quadrant for each lever.

6. In a bean harvester, the combination of a rigid frame; drive shafts mounted at the rear of said rigid frame, each shaft having a traction wheel keyed thereon; front axles and wheels mounted at the front of said rigid frame; guiding means for said front wheels; a frame having a transversely disposed actuating shaft journalled therein, pivotally mounted on each drive shaft; driving means for said actuating gears; a vertically disposed housing, having a vertically disposed shaft journalled therein, pivotally mounted on each actuating shaft; tilting means for said vertically disposed housings; and means to shift said vertically disposed housings transversely.

ROY E. MURPHY.